US005835385A

United States Patent [19]

Blauwblomme

[11] Patent Number: 5,835,385

[45] Date of Patent: Nov. 10, 1998

[54] INSTALLATION FOR DRIVING AND POSITIONING A FILM, IN PARTICULAR IN THE COURSE OF ETCHING BY A LASER BEAM

[75] Inventor: Jean-Pierre Blauwblomme, Paris, France

[73] Assignee: CMC - Cinema Magnetique Communication, Malakoff, France

[21] Appl. No.: 494,290

[22] Filed: Jun. 23, 1995

[30] Foreign Application Priority Data

Jun. 27, 1994 [FR] France .................................. 94 07876

[51] Int. Cl.[6] ............................ B41B 17/16; G06F 9/315

[52] U.S. Cl. .................... 364/559; 364/525; 364/474.08; 352/113; 352/180; 356/356

[58] Field of Search .................................... 364/559, 525, 364/474.08; 352/180, 187, 191, 166, 113; 348/61, 96–98; 356/139.03, 356, 363, 401

[56] References Cited

U.S. PATENT DOCUMENTS

| | | | |
|---|---|---|---|
| 3,636,838 | 1/1972 | Chang et al. | 352/113 |
| 4,398,223 | 8/1983 | Lemelson | 369/32 |
| 4,511,930 | 4/1985 | Lemelson | 369/32 |
| 5,404,490 | 4/1995 | Matsubayashi et al. | 369/110 |
| 5,448,357 | 9/1995 | Muraki | 356/356 |
| 5,489,986 | 2/1996 | Magome et al. | 356/401 |
| 5,510,893 | 4/1996 | Suzuki | 356/139.03 |
| 5,579,240 | 11/1996 | Buus | 364/525 |

FOREIGN PATENT DOCUMENTS

| | | |
|---|---|---|
| 0 282 611 | 9/1988 | European Pat. Off. . |
| 2 580 548 | 6/1987 | France . |
| 2 036 369 | 6/1980 | United Kingdom . |

*Primary Examiner*—James P. Trammell
*Assistant Examiner*—Bryan Bui
*Attorney, Agent, or Firm*—Larson & Taylor

[57] ABSTRACT

Installation for driving and positionally controlling a film 7, including a device for etching of the film by a LASER beam F. The displacements of laser beam F are controlled by an X-Y optical deflection system S, this system itself being under the control of a computer including subtitles in its memory. This installation also includes: a motor M controlled by the said computer and capable of setting the film 7 in continuous motion, possibly with interruptions, however, for etching of the subtitles; a sprocket drive mechanism 1 coupled to the motor M for driving the film; a device T for memory-storage of the defects in concentricity of the drive mechanism 1; and a system V for compensation between the device T and the optical deflection system S, for correcting the position of the etching LASER beam F, depending on the defects, so that each subtitle is in exactly the desired position with respect to the relevant image of the film, notwithstanding the defects, which are inherent in any drive mechanism.

3 Claims, 3 Drawing Sheets

FIG.1.
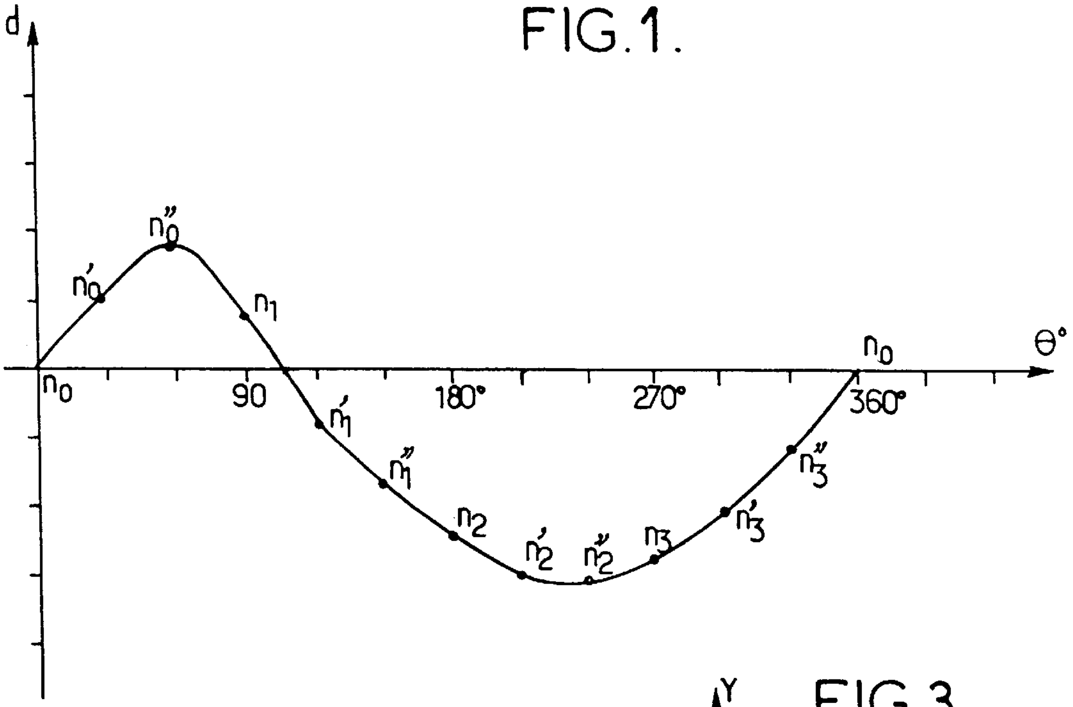
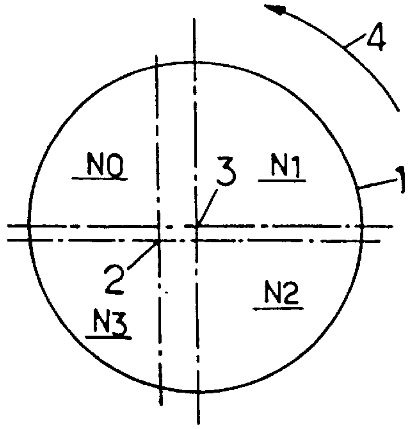
FIG.2.
FIG.3.
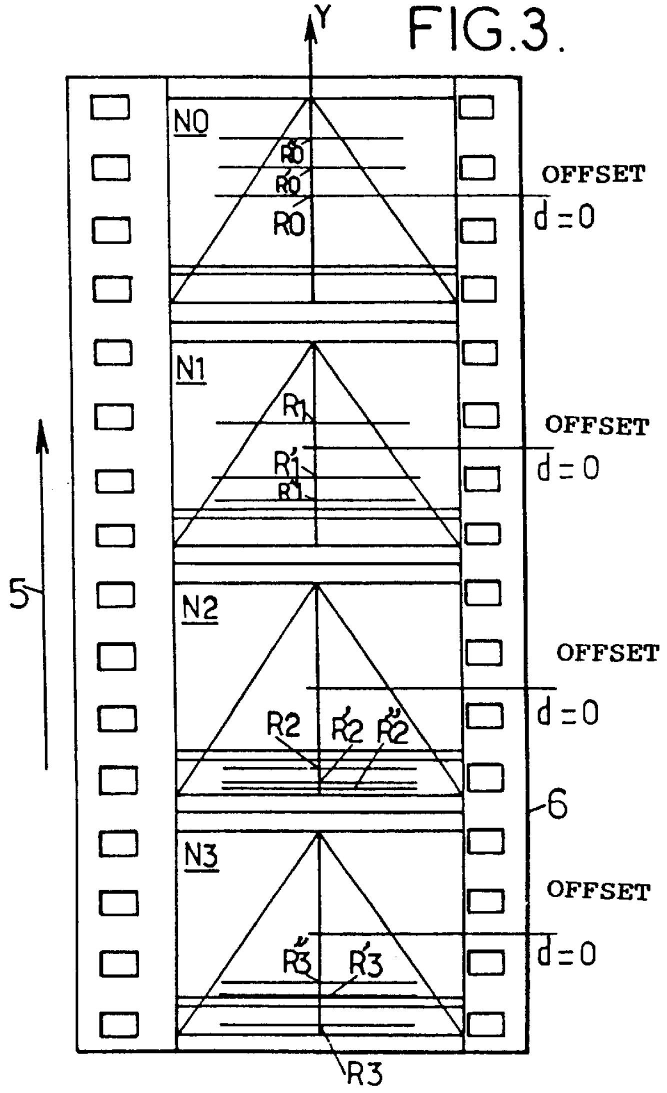

INSTALLATION FOR DRIVING AND POSITIONING A FILM, IN PARTICULAR IN THE COURSE OF ETCHING BY A LASER BEAM

The present invention relates to an installation for driving and positionally controlling a film, in particular a cinematographic film. It involves subjecting the film alternately to drive phases and to phases of precise positioning or even of stopping, either to view the image, or during which phases subtitling can be etched onto the film, at quite precise locations on the corresponding image.

In the best-known present-day installations, the mechanism for driving and positioning the film is of the type known as "claw and counter-claw" type. A high-torque, low-inertia electric motor, controlled by a computer, drives claws in rotation via a rotary central unit in which they can slide radially, these claws, when they are in the extracted position, coining into engagement with the perforations of the film in order to drive it. Driving of the film takes place over a half-cycle, i.e. one half-revolution. On the second half of the cycle, the claws return into the central unit, and the counter-claws come out of it in order to "line up" the film, that is to say to keep it in a precise position, both laterally and in the direction of motion of the film. The procedure is the same whatever the format of the film (16, 35 or 70 mm), and it is repeated for each image, whether in fast-forward mode or in etching mode.

Needless to say, this drive principle allows only a jerky motion of the film, and the precision of positioning the film is directly related to the mechanical precision of the claws and of the counter-claws, as well as to the setting-up of the cycle.

The object of the present invention is to allow a much more rapid motion of the film while very significantly increasing the accuracy with which it is positioned, whether the film is stopped or in motion, particularly in the case in which, in this positioning, etching of subtitles is carried out, on the corresponding images of the film by scanning with a LASER beam.

A method and an installation for etching subtitles on films, in particular cinematographic films, are already described in the French Patent No. 8505937 of 19 Apr. 1985 in the name of the Applicant. The installation employs a device for orienting the LASER beam in two planes perpendicular to one another by a deflector system, for example by reflection of the LASER beam on two X-Y mirrors, the displacements of which are controlled by galvanometric systems or the like, which are themselves under the control of a computer, which includes the subtitles for each image in its memory.

That being so, an installation for driving and positionally controlling a film in accordance with the present invention comprises a device for etching of the film by a LASER beam, the displacements of which are controlled by a X-Y optical deflection system, this system itself being under the control of a computer including subtitles in its memory, characterized in that it includes: a motor controlled by the said computer and capable of setting the film in continuous motion, possibly with interruptions, however, for etching of the said subtitles; a sprocket feed device coupled to the motor for driving the said film; a device for memory-storage of the defects in concentricity of the said feed device; and a system for compensation between the said device and the said optical deflection system, for correcting the position of the etching LASER beam, depending on the said defects, so that each subtitle is in exactly the desired position with respect to the relevant image of the film, notwithstanding the said defects, which are inherent in any feed device.

In this way, the coordinates of impact of the LASER beam are adjusted depending on any position of the image. This also means that two etching modes can be envisaged with such a mechanism: etching image by image and continuous etching, that is to say without stopping of the film, the displacement of the LASER beam then having a speed component equal and of the same sense as the speed of motion of the film.

For preference, such an installation further includes a digital coder keyed to the shaft of the motor, this coder consequently being capable of supplying the said compensation system with a signal representative of the actual angular position of the motor, that is to say its angular positioning error, this error being added to or being subtracted from the error in positioning of the film due to the eccentricity defects of the feed device, in order to obtain an overall positioning error which is sent to the said system for control of the deflectors.

The fact of controlling the drive motor of the feed device makes it possible to dispense with any currently known mechanical system, such as that of the "Maltese cross" and to ensure continuity of the motion of the film. The feed device corresponds to a toothed wheel in which the number of teeth equals a whole number of images. This whole number N is a function of the format of the film; for example for 16 mm, N=8, for 35 mm, N=4, etc.

The positional control of the motor makes it possible to fix the position of each of the images which is to receive etching, for example a subtitle, with respect to the normal position of the LASER beam, that is to say the position which it is in before any correcting deflection. The control of the motor in terms of speed makes it possible to adapt this speed to the number of images devoid of etching, so as to increase the speed of the motor, for example if two subtitled images are separated by a large number of non-subtitled images, and, in contrast, to reduce this speed if there is only a small number of consecutive images devoid of subtitles.

The errors in positioning of the film are the resultants of two phenomena originating from defects in geometry of the feed device and errors in position specific to the trajectory. These phenomena are dealt with simultaneously by the abovementioned compensation system, which imparts to the X-Y optical deflection system the corrections to be applied to the reference coordinates.

The defects in geometry of the feed device are essentially concentricity defects, resulting in an off-centring of its periphery, preventing a one-to-one relationship existing between the angle of rotation of this feed device and the linear position of the image. These geometric defects can easily be quantified, and the necessary corrections can easily be introduced in the form of compensation parameters into the LASER beam deflection system, as will be seen in detail below, by employing a setting-up pattern.

As to the positional errors specific to the trajectory, they are due mainly to the structure of the film, especially to its more or less "sticky" character, as well as to the inertia of its drive mechanism, even if the latter is small. However, these errors are easy to compensate for by virtue of the coder of the motor, which supplies the compensation system in real time with information representative of the position of the film. Once again, this will be seen better later on.

Finally, the invention further includes arrangements of a mechanical nature, in connection with the fact that the film in the course of etching may have a speed of motion which is much higher than when it is driven by conventional mechanisms.

In order for the etching to be of constant definition for the whole length of a subtitle, it is necessary for the film to be perfectly linear in the etching regions. With conventional mechanisms with claws and with counter-claws, the flatness of the film is ensured by a flat channel equipped with a presser. However, the use of a presser is a source of problems, since the pressure which it exerts on the film is not constant and it is even random depending on the nature of the films, resulting in instability at high speed. In any event, the capabilities afforded by the novel mechanism of the present invention, especially in terms of rapid transport of the film, render the system with a flat channel and presser obsolete.

In consequence, and in accordance with yet another arrangement of the invention, in order to obtain perfect flatness of the film while in motion, especially in the region of the etching by LASER ray, a curved channel equipped simply with contact rollers will be used.

The invention will now be illustrated by the description, given by way of an example which is no way limiting, of an installation for driving and positional control of film incorporating the arrangements which have just been discussed, the description being given with reference to the figures of the attached drawing in which:

FIG. 1 is a graph representing a possible eccentricity of a theoretically cylindrical feed device, the latter being shown diagrammatically in FIG. 2;

FIG. 3 shows the position of transverse markers traced on the patterns of a reference film after equal angular rotations of the said feed device;

In FIG. 1, a possible concentricity defect in the—theoretically cylindrical—film feed device, as referenced at 1 in FIG. 2, has been represented by way of example, on an X, Y graph. It has been assumed that it related to a "4—image" feed device, for example for 35 mm film and, in order to simplify the explanation, the eccentricity of the surface of the feed device with respect to its axis of rotation, referenced 2, which is highly offset with respect to the geometric axis 3, has been very greatly exaggerated. The direction of rotation of the feed device is represented by the arrow 4.

That being so, it can be seen that, if it is possible perfectly to fix the position of a reference image of the film with respect to a fixed marker, each of the following three images will be offset differently with respect to this marker, this offset depending on the eccentricity of the surface of the feed device in each of the four quarters N0, N1, N2 and N3 which constitute it.

Figure 4:
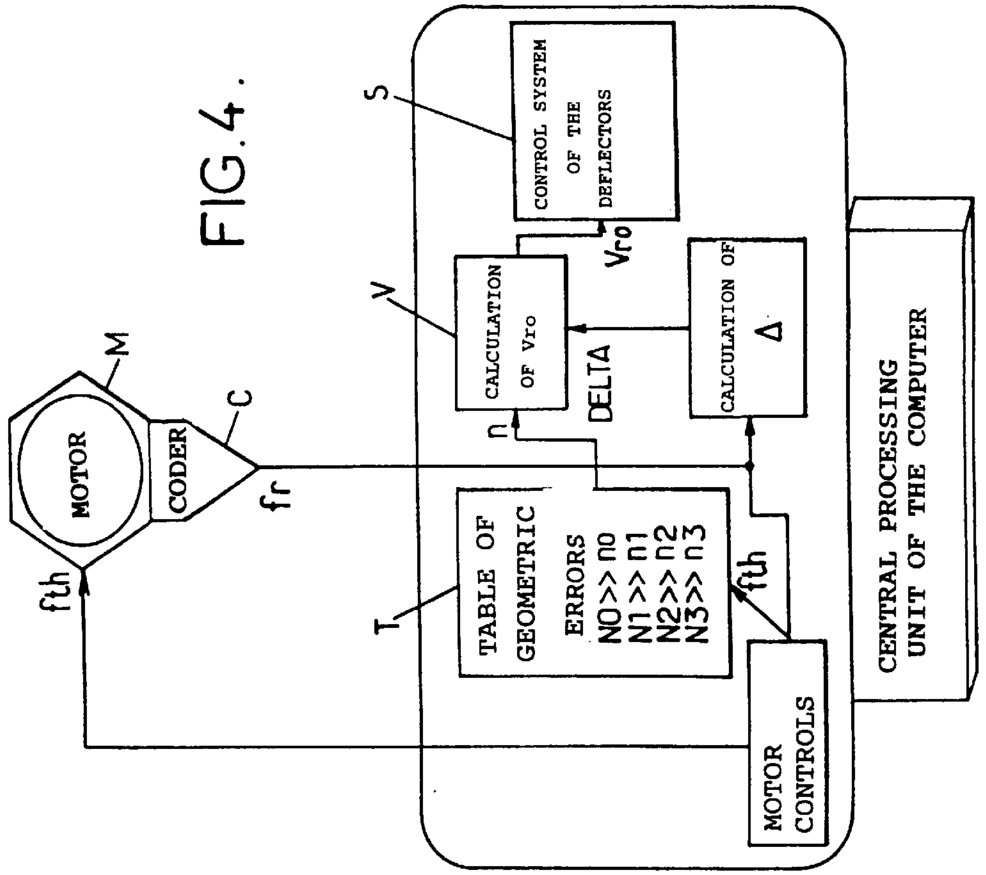

In order to discover, view and be able to use this offset so as to perform the desired compensation on the position of the LASER beam at the moment of etching, the following procedure may be followed, in the "image by image" etching mode. By using, for example, the setting-up pattern of FIG. 3 (piece of 35 mm film 6 exhibiting at least four images of the pattern), the horizontal marker R0 is traced on the image corresponding to the quarter N0 of the feed device, this marker R0 by convention having a zero offset; next the feed device is made to turn by a quarter of a turn, and the marker R1 is traced in the same way on the following image of the setting-up pattern, corresponding to the quarter N1 of the feed device (the direction of motion of the film has been indicated by the arrow 5 in FIG. 3). The same procedure is carried out for the markers R2 and R3, corresponding to the quarters N2 and N3. It is seen in FIG. 3 that each marker R1, R2 and R3 is offset differently with respect to the "0 offset" position which it should be in if the geometry of the feed device 1 were perfect. These offsets, measured by a coder C associated with the drive motor M of the feed device (see FIGS. 4 and 5) can then be used to consequently correct the position of the LASER beam during etching of a subtitle (acting on the control system S of the deflectors, and thus to provide the desired compensation so that each subtitle is exactly and precisely positioned with respect to the corresponding image.

In continuous etching mode, that is to say without stopping of the film, it is convenient, in contrast, to place a maximum of offset measurements of the markers in memory. With reference to FIG. 1, by way of example and for simplicity's sake, the use of only three markers per image has been shown, corresponding to three ordinate points per image, that is to say twelve points per feed device revolution, whereas four points are sufficient in "image by image" etching mode. In FIG. 1, these ordinate points are representative of the offset d of the marker R of the pattern (traced out every 30° of rotation of the feed device) with respect to its theoretical position in the case of an absence of eccentricity, are referenced $n_0$, $n'_0$, $n''_0$ for the first image, $n_1$, $n'_1$, $n''_1$, for the second image, etc.; the measurement of these ordinates is performed with the aid of a standard metrology system. The abscissae Θ° represent the angle of rotation of the feed device for each point: 30°, 60°, 90° etc., which angle is monitored by the control of the drive motor of the feed device. It is seen that the graph of FIG. 1 makes it possible to obtain perfect and instantaneous visual display of the defect in concentricity of the feed device. The setting of the parameters of the compensation system stems directly from the study of this curve.

This parameter setting is described below in the "image by image" etching mode.

As set out above, four ordinate points are sufficient, in image-by-image mode, to carry out the setting of the compensation system parameters. In this case, there is no curve to be studied, but only the ordinates of the points $n_0$, $n_1$, $n_2$ and $n_3$. With $n_0$ being the d=0 offset point, the fact that, this point has a zero offset correction value is stored in the compensation system V. For point $n_1$, it is noted that it is in advance with respect to 0. The setting of the parameters of the compensation system V for this point $n_1$ is done by memory storage in a "geometric error table" T (cf FIG. 4), of the value measured with a sign allocation so that the setting-up of the offset of the deflection system is done in the correct direction. For this example, it is assumed that the sign is negative.

The procedure is the same for the points $n_2$ and $n_3$; thus for:

$n_2$, a positive offset value is stored in memory $n_3$, a positive offset value greater than that of $n_2$ is stored in memory.

These compensations would be sufficient if the mechanisms (feed device-motor-coder) were free from all inertia and if the film did not exert any resistance during its motion. However, it is these mechanical factors which, in addition to the defect in geometry of the feed device 1, entail a positional error. This positional error, referenced Δ, is supplied directly by the coder C of the motor M. This coder C informs the compensation system V ($V_{ro}$ calculating unit in FIG. 4) of the actual position of the motor. The compensation system V compares the position obtained with respect to the theoretical position, and thus the system "knows" by what value it is advanced or retarded. This value is directly applied to the values stored in memory in the "error table" for the positions $n_0$, $n_1$, $n_2$, $n_3$.

It may be assumed, for example:

that the M-C mechanism should drive a film over a certain number of images;

that the first image to be etched corresponds to the quarter N1, for which the feed device 1, driven by the motor M, has a concentricity error defined by $n_1$;

that the coder C has four incrementation slopes each of 4096 incrementation points, i.e. a slope of 4096 points per image; and that the incrementation slope of the image of the quarter N1 is denoted F1, and the incrementation point corresponding to the theoretical position of the image Ni is fth1=0000.

Once the motion has taken place, the mechanism stops in order to perform the first etching.

Before starting the etching, the compensation system V (calculation of $V_{ro}$) analyzes the information which it receives:

image to be etched N1

→error due to the geometric, defects in the feed device 1 of value: $-n_1$

→actual position of the motor: fr1=0004, i.e. an error $|\Delta|$=4/4096 of image.

For example, if fr1=0004, that means that the image is in advance by four increments over its theoretical position, therefore that Δ is negative.

With these two items of information, the compensation system deduces the value of the offset (Vro) therefrom:

$$Vro=-n_1-(-\Delta)$$

This formula may thus be generalized in the following way:

let n be the error in geometry of the feed device 1 having a value for each image region;

let Δ be the difference between the actual position of the motor M and its theoretical position.

If F0, F1, F2, F3 are the names given to the four incrementation slopes of the coder C, fth the theoretical position of the motor M, and fr the actual position of the motor, it is noted that fth is positive if fr overshoots the theoretical position, and that fth is negative if fr does not reach the theoretical position.

Hence $$Vro=n-|\Delta|$$

with Δ positive for fr ∈ [fth−,fth]

Δ negative for fr ∈ [fth,fth+]

It is clear that this compensation by the intervention of the error variable Δ is valid only if the value of Δ is small, since otherwise the concentricity error would again intervene.

Once Vro is determined, the compensation system V supplies this value $V_{ro}$ to the system S for control of the deflectors (FIG. 4), and the etching of the first image commences. On passing to the second image to be etched, the value of Vro changes and the compensation system V recommences the analysis of the information which it receives; this analysis recommences for each image to be etched. When the mechanism is in fast-forward mode, the compensation system V is inoperative.

Figure 5:
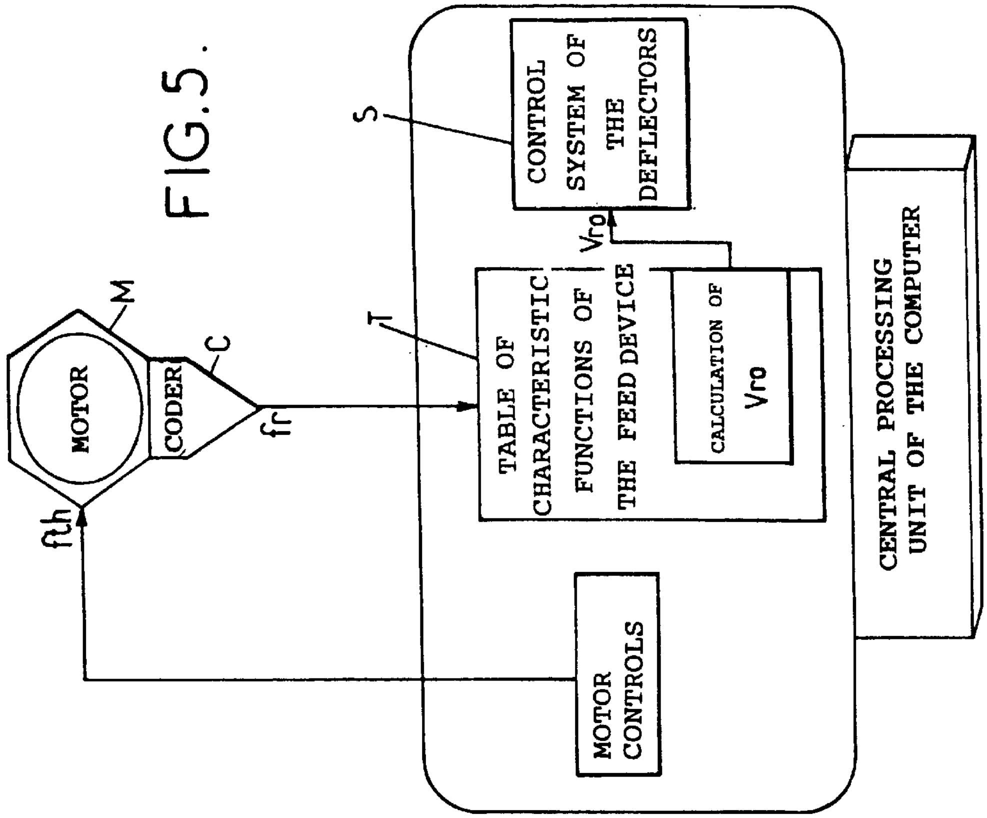
FIGS. 4 and 5 are block diagrams of the compensation system, respectively in "image by image" etching mode and in "continuous" etching mode.

In the continuous-etching operating mode (FIG. 5), the accuracy of the stability of the subtitles is related solely to the accuracy of the production of the curve for visually displaying the concentricity defect in the feed device 1. This curve represents mathematical functions over larger or smaller intervals. These functions and these intervals depend on the geometric defects in the feed device 1, placed in memory in "tables of characteristic functions of the feed device" T, as represented in FIG. 5, and will therefore be valid only for only one feed device.

For the compensation system V which continuously knows the position of the feed device 1, it is easy for it to calculate the ordinate as a function of the incrementation point, and thus of the amount of rotation of the feed device.

The present invention will make it possible for the speed of motion of the film to depend no longer on the mechanism for positioning the images, but only on the drive motor M, with a great reduction, moreover, in the stresses to which the film is subjected. The speeds of motion of the film, and thus the speed of the etching, can therefore be much higher than with conventional mechanisms; it is estimated that the speed of motion of the film may be multiplied by at least four, i.e. to 200 images per second or more. This result leads to an etching support other than the current supports being adopted, in order to avoid friction by a presser on the film at the site where the etching dictates that the film present a flat or at least linear surface.

Figure 6:
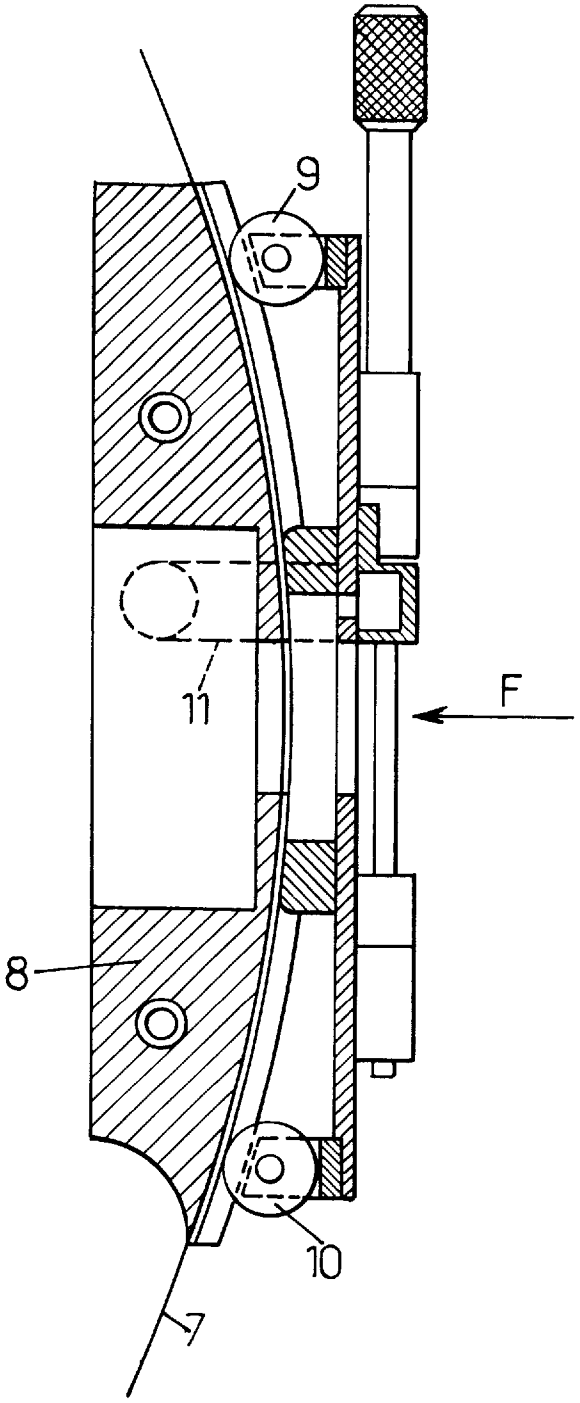
FIG. 6 is the vertical section of an etching support with curved channel and contact rollers.

In order to do this, the etching support with a curved channel and contact rollers represented in section in FIG. 6 may be used. In this figure, the direction from which the LASER beam arrives on the support has been represented by the arrow F, the film to be etched being referenced at 7 and the body of the curve channel at 8. There are two pairs of rollers for pressing the film, referenced 9 and 10. The fumes originating from the etching may be evacuated by a suction window 11. The two pressing rollers need only to bear on the edges of the film, which is sufficient to keep it flat in the region of the subtitle to be etched, while limiting the friction and the stresses to which the film may be subjected to a minimum.

In addition to the advantages which have already been mentioned, it should be noted that the invention will make it possible to obtain a reduction in the cost of manufacture by reason of the reduction in the mechanical manufacturing tolerances, as well as a reduction in the number of maintenance operations by reason of the near disappearance of mechanical setting-up.

I claim:

1. Installation for driving and positionally controlling a film (7), comprising a device for etching of the film by a LASER beam (F), the displacements of which are controlled by an X-Y optical deflection system (S), this system itself being under the control of a computer including subtitles in its memory, characterized in that it includes: a motor (M) controlled by said computer and capable of setting the film (7) in continuous motion, possibly with interruptions, however, for etching of said subtitles; a sprocket feed device (1) coupled to the motor (M) for driving said film; a device (T) for memory-storage of the defects in concentricity of said feed device (1); and a system (V) for compensation between said device (T) and said optical deflection system (S), for correcting the position of the etching LASER beam (F), depending on said defects, so that each subtitle is in exactly the desired position with respect to the relevant image of the film, notwithstanding said defects, which are inherent in any feed device.

2. Installation according to claim 1, characterized in that it further includes a digital coder (C) keyed to the shaft of the motor (M), this coder consequently being capable of supplying said compensation system (V) with a signal representative of the actual angular position of the motor, that is to say its angular positioning error (Δ), this error being added to or being subtracted from the error (n) in positioning of the film (7) due to the eccentricity defects of the feed device (1), in order to obtain an overall positioning error ($V_{ro}$) which is sent to said system (S) for control of the deflectors.

3. Installation according to claim 1 characterized in that it includes an etching support with a curved channel (8) and rollers (9, 10) for pressing the film (7), acting on the edges of the latter.

* * * * *